United States Patent
Spiegel et al.

(10) Patent No.: US 10,084,735 B1
(45) Date of Patent: *Sep. 25, 2018

(54) APPARATUS AND METHOD FOR ALTERNATE CHANNEL COMMUNICATION INITIATED THROUGH A COMMON MESSAGE THREAD

(71) Applicant: Snap Inc., Venice, CA (US)

(72) Inventors: Evan Spiegel, Venice, CA (US); Robert Murphy, Venice, CA (US)

(73) Assignee: Snap Inc., Venice, CA (US)

( * ) Notice: Subject to any disclaimer, the term of this patent is extended or adjusted under 35 U.S.C. 154(b) by 90 days.

This patent is subject to a terminal disclaimer.

(21) Appl. No.: 14/616,618

(22) Filed: Feb. 6, 2015

Related U.S. Application Data

(63) Continuation of application No. 14/187,005, filed on Feb. 21, 2014.

(51) Int. Cl.
*H04L 12/58* (2006.01)

(52) U.S. Cl.
CPC .............. *H04L 51/16* (2013.01); *H04L 51/10* (2013.01)

(58) Field of Classification Search
CPC ...................................................... H04L 51/04
See application file for complete search history.

(56) References Cited

U.S. PATENT DOCUMENTS

| | | | |
|---|---|---|---|
| 5,999,932 A | 12/1999 | Paul | |
| 6,154,764 A | 11/2000 | Nitta et al. | |
| 6,167,435 A | 12/2000 | Druckenmiller et al. | |
| 6,204,840 B1 | 3/2001 | Petelycky et al. | |
| 6,216,141 B1 | 4/2001 | Straub et al. | |
| 6,310,694 B1 | 10/2001 | Okimoto et al. | |
| 6,442,590 B1 | 8/2002 | Inala et al. | |
| 6,484,196 B1 | 11/2002 | Maurille | |
| 6,665,531 B1 | 12/2003 | Soderbacka et al. | |
| 6,724,403 B1 | 4/2004 | Santoro et al. | |
| 6,757,713 B1 | 6/2004 | Ogilvie et al. | |
| 6,898,626 B2 | 5/2005 | Ohashi | |
| 7,004,394 B2 | 2/2006 | Kim | |
| 7,124,164 B1 | 10/2006 | Chemtob | |
| 7,149,893 B1 | 12/2006 | Leonard et al. | |

(Continued)

FOREIGN PATENT DOCUMENTS

| | | |
|---|---|---|
| CA | 2887596 A1 | 6/2016 |
| EP | 2418606 A2 | 2/2012 |

(Continued)

OTHER PUBLICATIONS

IVisit Mobile: Getting Started, Dec. 4, 2013, iVisit, pp. 1-16.*

(Continued)

*Primary Examiner* — Justin S Lee
(74) *Attorney, Agent, or Firm* — Schwegman Lundberg & Woessner, P.A.

(57) ABSTRACT

A server includes a processor and a memory storing a multiple channel message thread module with instructions executed by the processor to identify when participants at client devices are viewing a common message thread. An alternate channel communication prompt is supplied to the client devices. An alternate channel communication is delivered to the client devices in response to activation of the alternate channel communication prompt by at least one participant.

8 Claims, 4 Drawing Sheets

(56) References Cited

U.S. PATENT DOCUMENTS

| | | |
|---|---|---|
| 7,203,380 B2 | 4/2007 | Chiu et al. |
| 7,243,163 B1 | 7/2007 | Friend et al. |
| 7,356,564 B2 | 4/2008 | Hartselle et al. |
| 7,519,670 B2 | 4/2009 | Hagale et al. |
| 7,856,449 B1 | 12/2010 | Martino et al. |
| 8,001,204 B2 | 8/2011 | Burtner et al. |
| 8,098,904 B2 | 1/2012 | Ioffe et al. |
| 8,112,716 B2 | 2/2012 | Kobayashi |
| 8,276,092 B1 | 9/2012 | Narayanan et al. |
| 8,279,319 B2 | 10/2012 | Date |
| 8,312,086 B2 | 11/2012 | Velusamy et al. |
| 8,312,097 B1 | 11/2012 | Siegel et al. |
| 8,379,130 B2 | 2/2013 | Forutanpour et al. |
| 8,405,773 B2 | 3/2013 | Hayashi et al. |
| 8,418,067 B2 | 4/2013 | Cheng et al. |
| 8,428,453 B1 | 4/2013 | Spiegel et al. |
| 8,471,914 B2 | 6/2013 | Sakiyama et al. |
| 8,560,612 B2 | 10/2013 | Kilmer et al. |
| 8,687,021 B2 | 4/2014 | Bathiche et al. |
| 8,744,523 B2 | 6/2014 | Fan et al. |
| 8,775,407 B1 | 7/2014 | Huang |
| 8,775,972 B2 | 7/2014 | Spiegel |
| 8,788,680 B1 | 7/2014 | Naik |
| 8,797,415 B2 | 8/2014 | Arnold |
| 8,856,349 B2 | 10/2014 | Jain et al. |
| 8,914,752 B1 | 12/2014 | Spiegel |
| 9,026,943 B1 | 5/2015 | Spiegel |
| 9,037,577 B1 | 5/2015 | Saylor et al. |
| 9,083,770 B1 | 7/2015 | Dröse et al. |
| 9,098,832 B1 * | 8/2015 | Scardino ............ G06Q 10/107 |
| 9,225,897 B1 | 12/2015 | Sehn |
| 9,237,202 B1 | 1/2016 | Sehn |
| 9,276,886 B1 | 3/2016 | Samaranayake |
| 9,396,354 B1 | 7/2016 | Murphy et al. |
| 9,407,712 B1 | 8/2016 | Sehn |
| 9,407,816 B1 | 8/2016 | Sehn |
| 9,785,796 B1 | 10/2017 | Murhpy et al. |
| 2002/0047868 A1 | 4/2002 | Miyazawa |
| 2002/0122659 A1 | 9/2002 | McGrath et al. |
| 2002/0144154 A1 | 10/2002 | Tomkow |
| 2003/0016247 A1 | 1/2003 | Lai et al. |
| 2003/0052925 A1 | 3/2003 | Daimon et al. |
| 2003/0126215 A1 | 7/2003 | Udell et al. |
| 2003/0164856 A1 | 9/2003 | Prager et al. |
| 2004/0027371 A1 | 2/2004 | Jaeger |
| 2004/0111467 A1 | 6/2004 | Willis |
| 2004/0203959 A1 | 10/2004 | Coombes |
| 2004/0243531 A1 | 12/2004 | Dean |
| 2005/0078804 A1 | 4/2005 | Yomoda |
| 2005/0097176 A1 | 5/2005 | Schatz et al. |
| 2005/0104976 A1 | 5/2005 | Currans |
| 2005/0114783 A1 | 5/2005 | Szeto |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson et al. |
| 2005/0223066 A1 | 10/2005 | Buchheit et al. |
| 2006/0114338 A1 | 6/2006 | Rothschild |
| 2006/0270419 A1 | 11/2006 | Crowley et al. |
| 2007/0040931 A1 | 2/2007 | Nishizawa |
| 2007/0064899 A1 | 3/2007 | Boss et al. |
| 2007/0073823 A1 | 3/2007 | Cohen et al. |
| 2007/0082707 A1 | 4/2007 | Flynt et al. |
| 2007/0192128 A1 | 8/2007 | Celestini |
| 2007/0214216 A1 | 9/2007 | Carrer et al. |
| 2007/0233801 A1 | 10/2007 | Eren et al. |
| 2007/0243887 A1 | 10/2007 | Bandhole et al. |
| 2007/0255456 A1 | 11/2007 | Funayama |
| 2008/0025701 A1 | 1/2008 | Ikeda |
| 2008/0033930 A1 | 2/2008 | Warren |
| 2008/0055269 A1 | 3/2008 | Lemay et al. |
| 2008/0104503 A1 | 5/2008 | Beall et al. |
| 2008/0132275 A1 * | 6/2008 | Eastwood ......... H04M 1/72519 455/556.1 |
| 2008/0207176 A1 | 8/2008 | Brackbill et al. |
| 2008/0222545 A1 | 9/2008 | Lemay et al. |
| 2008/0256446 A1 | 10/2008 | Yamamoto |
| 2008/0266421 A1 | 10/2008 | Takahata et al. |
| 2008/0270938 A1 | 10/2008 | Carlson |
| 2008/0313346 A1 | 12/2008 | Kujawa et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0132453 A1 | 5/2009 | Hangartner et al. |
| 2009/0132665 A1 | 5/2009 | Thomsen et al. |
| 2009/0160970 A1 | 6/2009 | Fredlund et al. |
| 2009/0265647 A1 | 10/2009 | Martin et al. |
| 2010/0082693 A1 | 4/2010 | Hugg et al. |
| 2010/0131880 A1 | 5/2010 | Lee et al. |
| 2010/0131895 A1 | 5/2010 | Wohlert |
| 2010/0156933 A1 | 6/2010 | Jones et al. |
| 2010/0159944 A1 | 6/2010 | Pascal et al. |
| 2010/0161831 A1 | 6/2010 | Haas et al. |
| 2010/0185665 A1 | 7/2010 | Horn et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0257196 A1 | 10/2010 | Waters et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0102605 A1 | 5/2011 | Hannaford |
| 2011/0102630 A1 | 5/2011 | Rukes |
| 2011/0141025 A1 | 6/2011 | Tsai |
| 2011/0145564 A1 | 6/2011 | Moshir et al. |
| 2011/0184980 A1 | 7/2011 | Jeong et al. |
| 2011/0197194 A1 | 8/2011 | D'Angelo et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0273575 A1 | 11/2011 | Lee |
| 2011/0283188 A1 | 11/2011 | Farrenkopf et al. |
| 2011/0286586 A1 | 11/2011 | Saylor et al. |
| 2011/0320373 A1 | 12/2011 | Lee et al. |
| 2012/0028659 A1 | 2/2012 | Whitney et al. |
| 2012/0062805 A1 | 3/2012 | Candelore |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco et al. |
| 2012/0163664 A1 | 6/2012 | Zhu |
| 2012/0166971 A1 | 6/2012 | Sachson et al. |
| 2012/0169855 A1 | 7/2012 | Oh |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0200743 A1 | 8/2012 | Blanchflower et al. |
| 2012/0210244 A1 | 8/2012 | deFrancisco Lopez et al. |
| 2012/0212632 A1 | 8/2012 | Mate et al. |
| 2012/0220264 A1 | 8/2012 | Kawabata |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0278387 A1 | 11/2012 | Garcia et al. |
| 2012/0278692 A1 | 11/2012 | Shi |
| 2012/0281129 A1 * | 11/2012 | Wang ................ H04N 5/23219 348/333.01 |
| 2012/0299954 A1 | 11/2012 | Wada et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |

(56) References Cited

U.S. PATENT DOCUMENTS

| | | |
|---|---|---|
| 2012/0323933 A1 | 12/2012 | He et al. |
| 2013/0050260 A1 | 2/2013 | Reitan |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0085790 A1 | 4/2013 | Palmer et al. |
| 2013/0128059 A1 | 5/2013 | Kristensson |
| 2013/0145286 A1 | 6/2013 | Feng et al. |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0194301 A1 | 8/2013 | Robbins et al. |
| 2013/0198176 A1 | 8/2013 | Kim |
| 2013/0222323 A1 | 8/2013 | McKenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0290443 A1 | 10/2013 | Collins et al. |
| 2013/0344896 A1 | 12/2013 | Kirmse et al. |
| 2013/0346877 A1 | 12/2013 | Borovoy et al. |
| 2014/0011538 A1 | 1/2014 | Mulcahy et al. |
| 2014/0032682 A1 | 1/2014 | Prado et al. |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0085334 A1 | 3/2014 | Payne |
| 2014/0100997 A1 | 4/2014 | Mayerle |
| 2014/0089314 A1 | 5/2014 | Iizuka et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173457 A1 | 6/2014 | Wang et al. |
| 2014/0189592 A1 | 7/2014 | Benchenaa et al. |
| 2014/0201527 A1 | 7/2014 | Krivorot |
| 2014/0207679 A1 | 7/2014 | Cho |
| 2014/0214471 A1 | 7/2014 | Schreiner, III |
| 2014/0279436 A1 | 9/2014 | Dorsey et al. |
| 2014/0280537 A1 | 9/2014 | Pridmore et al. |
| 2014/0282096 A1 | 9/2014 | Rubinstein et al. |
| 2014/0298210 A1* | 10/2014 | Park .................. G06F 3/0486 715/758 |
| 2014/0317302 A1 | 10/2014 | Naik |
| 2014/0325383 A1 | 10/2014 | Brown et al. |
| 2014/0359024 A1 | 12/2014 | Spiegel |
| 2014/0359032 A1 | 12/2014 | Spiegel et al. |
| 2015/0046278 A1 | 2/2015 | Pei et al. |
| 2015/0094106 A1 | 4/2015 | Grossman et al. |
| 2015/0116529 A1 | 4/2015 | Wu et al. |
| 2015/0172534 A1 | 6/2015 | Miyaka |
| 2015/0222814 A1 | 8/2015 | Li et al. |
| 2016/0006927 A1 | 1/2016 | Sehn |

FOREIGN PATENT DOCUMENTS

| | | |
|---|---|---|
| EP | 2482537 A1 | 8/2012 |
| KR | 2012 0003323 A | 1/2012 |
| WO | WO 2013/008238 A1 | 1/2013 |
| WO | WO 2014/194262 A2 | 12/2014 |
| WO | WO 2016/007285 A1 | 1/2016 |

OTHER PUBLICATIONS

Android Getting Started Guide, Feb. 1, 2014, Voxer Business, pp. 1-19.*

International Search Report and Written Opinion issued to international patent application No. PCT/US2015/037251, Sep. 29, 2015, 7 pgs.

IVisit, "iVisit Mobile Getting Started", Dec. 4, 2013, iVisit, pp. 1-16.

Melanson, Mike, "This text message will self destruct in 60 seconds", available on Feb. 11, 2011, retrieved from readwrite.com on Feb. 18, 2015, link: http://readwrite.com/2011/02/11/this_text_message_will_self destruct_in_60_seconds, referred to hereinafter as READ-WRITE.

Sawers, Paul, "Snapchat for iOS Lets You Send Photos to Friends and Set How long They're Visible for", May 7, 2012, <http://thenextweb.com/apps/2012/05/07/Snapchat-for-ios-lets-you-send-photos-to-friends-and-set-how-long-theyre-visiblefor/#!xCjrp>, pp. 1-5.

Shein, "Ephemeral Data", Communications of the ACM, vol. 56, No. 9, pp. 20-22, Sep. 2013.

Snapchat, "How Snaps Are Stored and Deleted", May 9, 2013, 3 pgs.

International Search Report and Written Opinion issued to International Patent Application No. PCT/US2014/040346, dated Mar. 23, 2015, 9 pgs.

Fajman, "An Extensible Message Format for Message Disposition Notifications", Request for Comments: 2298, National Institutes of Health, Mar. 1998, 28 pgs.

Supplementary European Search Report issued to EP Application No. 14804343.3, Sep. 29, 2016, 11 pgs.

U.S. Appl. No. 14/187,005, filed Feb. 21, 2014, Apparatus and Method for Alternate Channel Communication Initiated Through a Common Message Thread.

U.S. Appl. No. 14/510,051, filed Oct. 8, 2014, Apparatus and Method for Alternate Channel Communication Initiated Through a Common Message Thread.

"U.S. Appl. No. 14/510,051, Advisory Action dated Jun. 7, 2017", 3 pgs.

"U.S. Appl. No. 14/510,051, Examiner Interview Summary dated Jul. 21, 2017", 5 pgs.

"U.S. Appl. No. 14/510,051, Final Office Action dated Apr. 4, 2017", 22 pgs.

"U.S. Appl. No. 14/510,051, Final Office Action dated Dec. 13, 2017", 16 pgs.

"U.S. Appl. No. 14/510,051, Non Final Office Action dated Jul. 12, 2017", 20 pgs.

"U.S. Appl. No. 14/510,051, Non Final Office Action dated Nov. 4, 2016", 10 pgs.

"U.S. Appl. No. 14/510,051, Response filed Mar. 13, 2018 to Final Office Action dated Dec. 13, 2017", 6 pgs.

"iVisit Mobile: Getting Started", IVISIT, (Dec. 4, 2013), 1-16.

Extended Search Report issued to European Patent Application No. 15819676.6, Oct. 12, 2017, 8 pgs.

* cited by examiner

US 10,084,735 B1

APPARATUS AND METHOD FOR ALTERNATE CHANNEL COMMUNICATION INITIATED THROUGH A COMMON MESSAGE THREAD

CROSS REFERENCE TO RELATED APPLICATIONS

This application is a continuation of U.S. patent application Ser. No. 14/187,005 filed Feb. 21, 2014, the contents of which are incorporated herein by reference.

FIELD OF THE INVENTION

This invention relates generally to communications in computer networks. More particularly, this invention relates to techniques for initiating an additional communication channel from a common text message communication channel.

BACKGROUND OF THE INVENTION

Currently, when a first individual desires to initiate a telephone call or video call with a second individual the first individual uses his or her communication equipment to initiate a ringtone at the communication equipment of the second individual. Acknowledgement of the ringtone is required to establish the presence of the second individual. The ring tone notification technique has been relied upon since the inception of telephones, well over one hundred years ago. It would be desirable to find an alternate methodology to establish the presence of an individual and to initiate conversations, without reliance upon a technique over one hundred years old that is a relic of the technical constraints of analog telephony.

SUMMARY OF THE INVENTION

A server includes a processor and a memory storing a multiple channel message thread module with instructions executed by the processor to identify when participants at client devices are viewing a common message thread. An alternate channel communication prompt is supplied to the client devices. An alternate channel communication is delivered to the client devices in response to activation of the alternate channel communication prompt by at least one participant.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
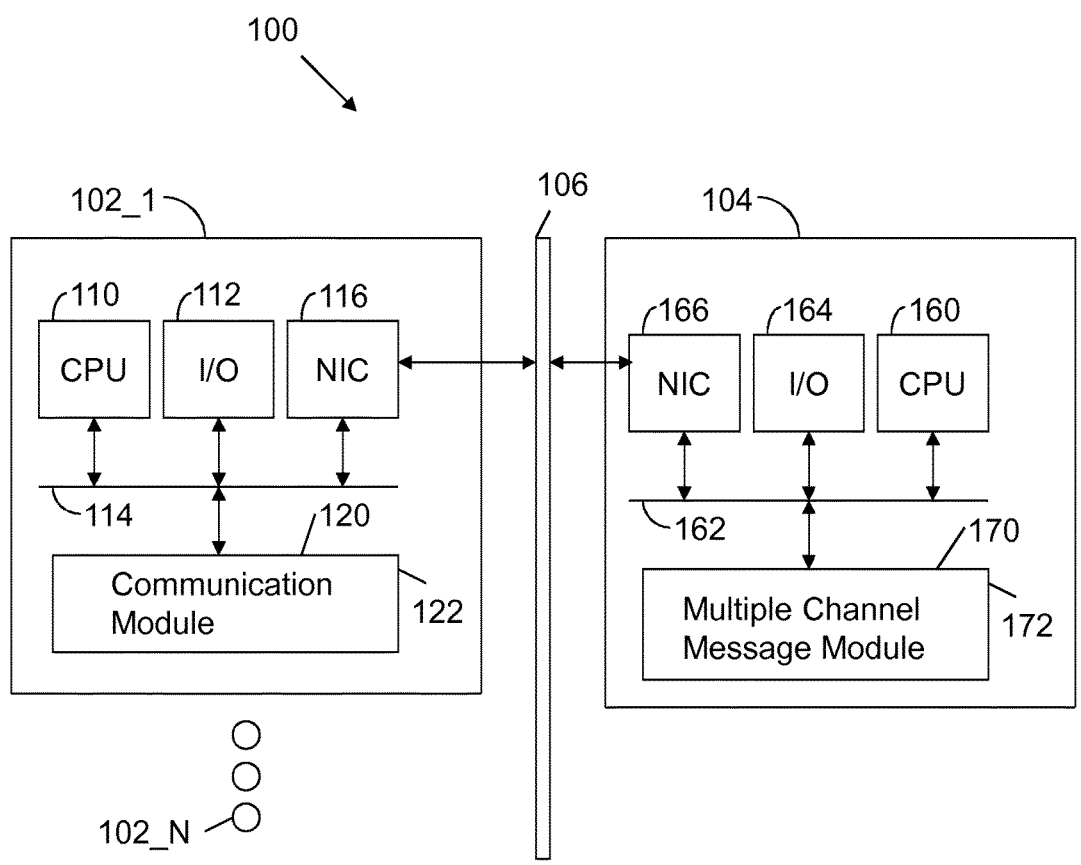
FIG. 1 illustrates a system configured in accordance with an embodiment of the invention.

FIG. 1 illustrates a system 100 configured in accordance with an embodiment of the invention. The system 100 includes a set of client devices 102_1 through 102_N connected to a server 104 via a network 106, which may be any combination of wired and wireless networks.

Each client device 102 includes standard components, such as a central processing unit 110 and input/output devices 112 connected via a bus 114. The input/output devices 112 may include a touch display, keyboard, trackball and the like. A network interface circuit 116 is also connected to the bus 114 to provide connectivity to network 106. A memory 120 is also connected to the bus 114. The memory 120 stores a communication module 122, which may be a browser or an application to support communications with server 104. The client device 102 is typically a mobile device, such as a Smartphone or Tablet.

Server 104 also includes standard components, such as a central processing unit 160, a bus 162, input/output devices 164 and a network interface circuit 166. A memory 170 is also connected to the bus 162. The memory 170 stores a multiple channel message module 172, which includes executable instructions to implement operations of the invention. In short, the executable instructions identify the common presence of participants in a text based thread. In response, to such common presence, participants are afforded the opportunity to initiate an alternate communication channel, such as an audio channel or voice channel without the prerequisite of a ringtone.

Figure 2:
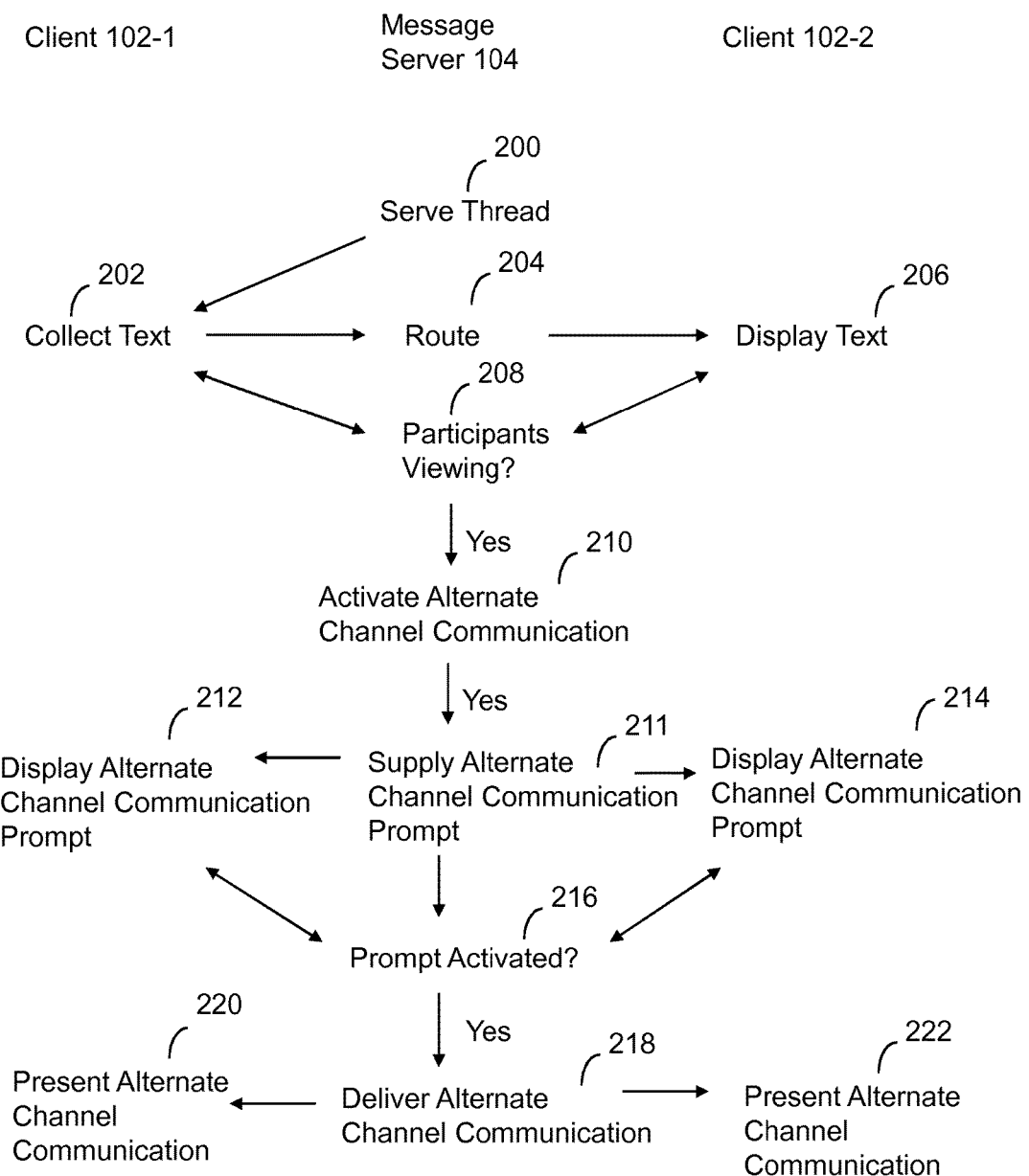
FIG. 2 illustrates processing operations associated with an embodiment of the invention.

FIG. 2 illustrates operations associated with an embodiment of the invention. In particular, the figure illustrates operations performed by two client devices 102_1 and 102_2, as coordinated by the message server 104. Initially, the message server 104 serves a thread 200. By way of example, the thread is a text communication sequence between a first participant associated with client 102_1 and a second participant associated with client 102_2. Additional participants may be involved, but are omitted for simplicity of presentation.

The client device 102_1 collects a new text entry 202, which is routed by the message server 104 to client 102_2. The client 102_2 displays the text 206. The message server 104 determines if the participants are viewing the same thread 208. That is, the message server 104 evaluates whether each client device is actively displaying the same thread on the display of the client device. If so, the message server proactively activates an alternate channel communication 210. This can be thought of as a digital call set-up, where the telephone call is muted but active. The server also supplies each device with an alternate channel communication prompt 211. The alternate channel communication prompt is displayed 212 on client 102_1 and is displayed 214 on client 102_2. The alternate channel communication prompt signals to the participants that the message thread is being actively viewed by each participant.

Figure 3:
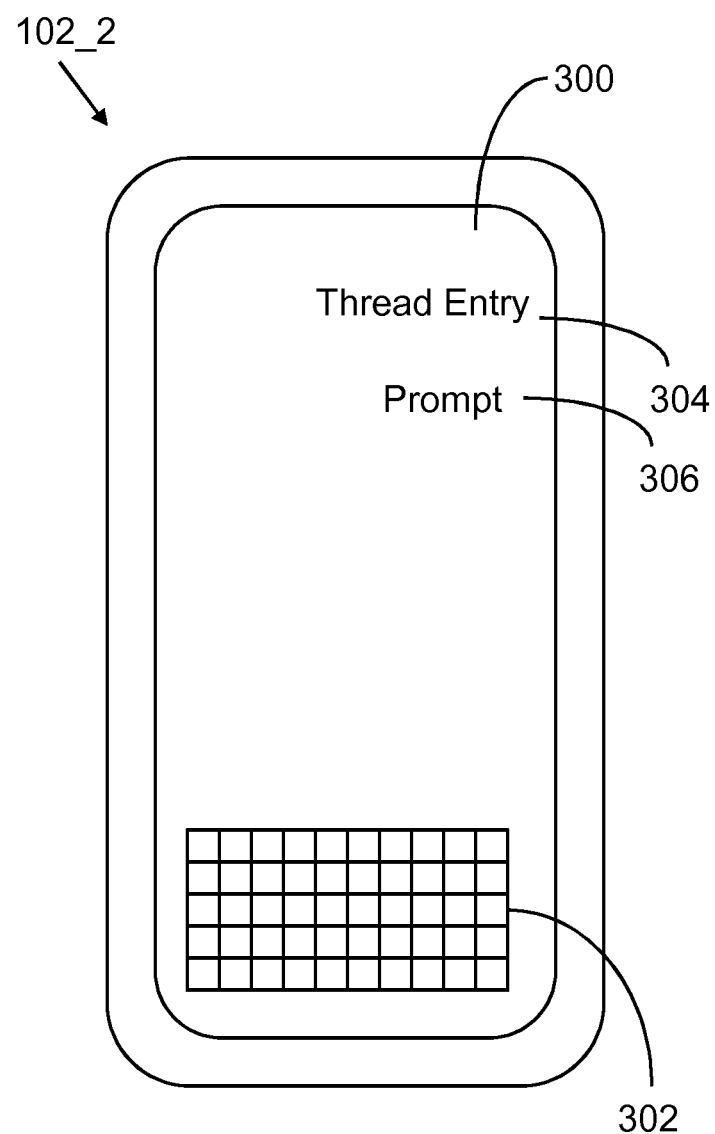
FIG. 3 illustrates user interface attributes associated with an embodiment of the invention.

FIG. 3 illustrates client device 102_2 with a display 300 and keyboard 302. The display shows a thread entry 304 and an associated prompt 306 indicating common viewing of the thread. The prompt 306 may be in the form of text, an icon, an image and the like.

Returning to FIG. 2, the message server 104 determines whether the prompt is activated 216. For example, activation may be in the form of haptic contact by the participant on the prompt as displayed on a screen. If a prompt is activated, then the message server 104 delivers (e.g., un-mutes the set up call) the alternate channel communication 218. The alternate channel communication may be presented 220 on client 102_1 and/or be presented 222 on client 102_2. The processing of FIG. 2 is advantageous because of the proactive activation of the alternate channel communication before a prompt is activated. An alternate embodiment may activate the alternate channel communication in response to prompt activation.

Figure 4:
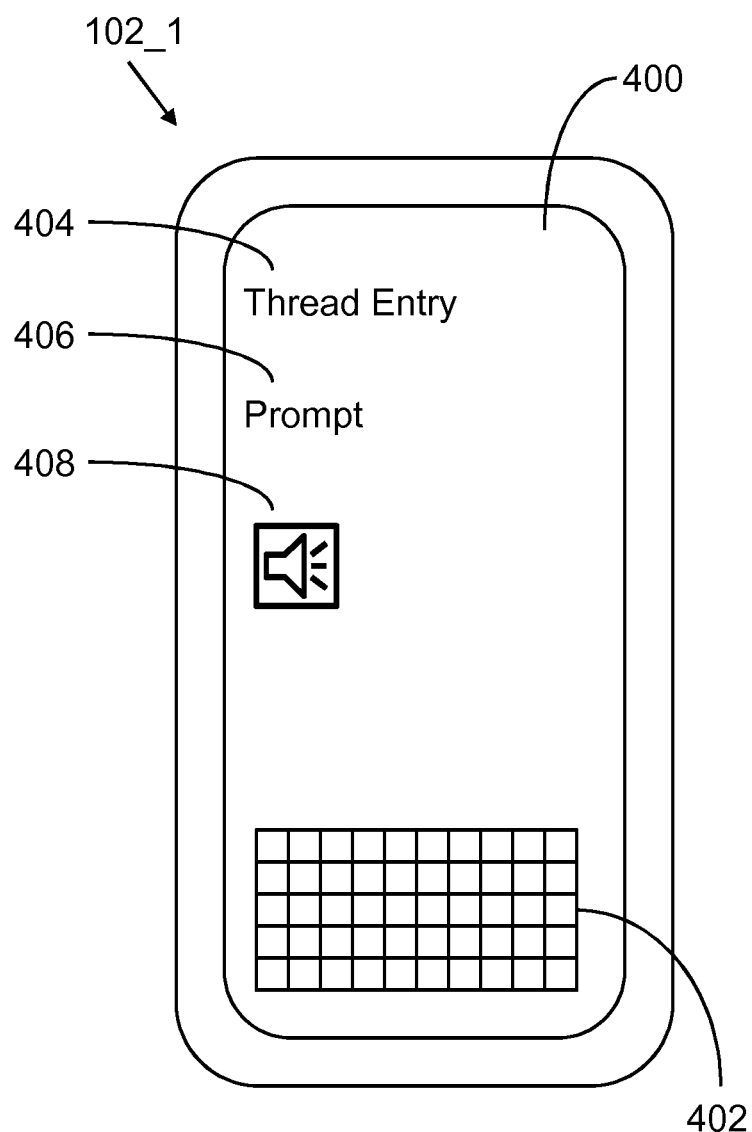
FIG. 4 illustrates user interface attributes, including an alternate channel communication indicator, associated with an embodiment of the invention.

FIG. 4 illustrates client 102_1 with a display 400 and keyboard 402. The display 400 has a thread entry 404, a prompt 406 and an alternate channel indicator 408. In this example, the alternate channel indicator 408 may be a speaker indicative of an audio channel being initiated by the participant using client device 102_2. The alternate channel indicator 408 may be a block of video initiated by the participant using client device 102_2. In the example of FIG. 4, the message thread is shown with the alternate channel indicator. Alternately, the alternate channel indicator may occupy the entire display, which would be desirable in the case of a video session.

In one embodiment, the alternate channel communication persists during haptic contact with the alternate channel communication prompt by at least one participant. The alternate channel communication may include input from each participant making haptic contact with the alternate channel communication prompt.

The alternate channel communication may be a unidirectional audio session initiated through haptic content of a prompt by a first participant that is broadcast to the remaining participants. The alternate channel communication may be a bidirectional audio session between participants making haptic contact with the alternate channel communication prompt.

The alternate channel communication may be a unidirectional video session initiated through haptic contact of a prompt by a first participant that is broadcast to the remaining participants. The alternate channel communication may be a bidirectional video session between participants making haptic contact with the alternate channel communication prompt.

The prompt may include channel selection options, such as audio and/or video. The alternate channel communications may be coordinated through the message server using Internet Protocol packet switching techniques.

An embodiment of the present invention relates to a computer storage product with a non-transitory computer readable storage medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media, optical media, magneto-optical media and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using JAVA®, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

What is claimed is:

1. A server, comprising:
   a processor; and
   a memory storing a multiple channel message thread module with instructions executed by the processor to:
   identify when participants at client devices are actively displaying a common text communication message thread at the same time to establish a participant viewing state indicative of the presence of the participants;
   in response to the participant viewing state, activate by the server without input from the participants an alternate communication session between the client devices in an active but mute state;
   supply to the client devices an alternate channel communication prompt in response to the operation to activate the alternate communication session; and
   complete the alternate communication session at the client devices by eliminating the mute state in response to activation of the alternate channel communication prompt by at least one participant, wherein the alternate communication session is one of an audio session and a video session.

2. The server of claim 1 wherein the alternate communication session persists during haptic contact with the alternate channel communication prompt by at least one participant.

3. The server of claim 2 wherein the alternate communication session includes input from each participant making haptic contact with the alternate channel communication prompt.

4. The server of claim 1 wherein the alternate communication session is a unidirectional audio session initiated by a first participant that is broadcast to the remaining participants.

5. The server of claim 1 wherein the alternate communication session is a bidirectional audio session between participants making haptic contact with the alternate channel communication prompt.

6. The server of claim 1 wherein the alternate communication session is a unidirectional video session initiated by a first participant that is broadcast to the remaining participants.

7. The server of claim 1 wherein the alternate communication session is a bidirectional video session between participants making haptic contact with the alternate channel communication prompt.

8. The server of claim 1 wherein the alternate communication session is presented with the common message thread.

* * * * *